April 5, 1949.  C. N. McL. WORNELL  2,466,140
DEPTH GAUGE
Filed June 19, 1945  2 Sheets-Sheet 1
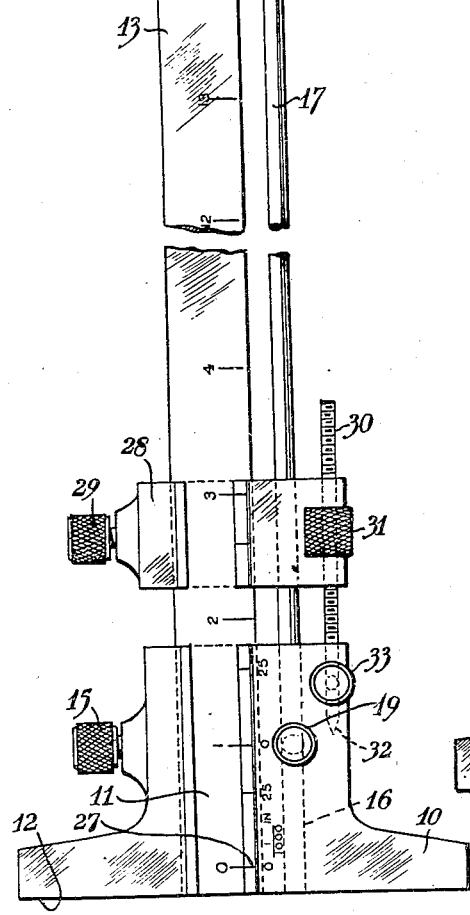
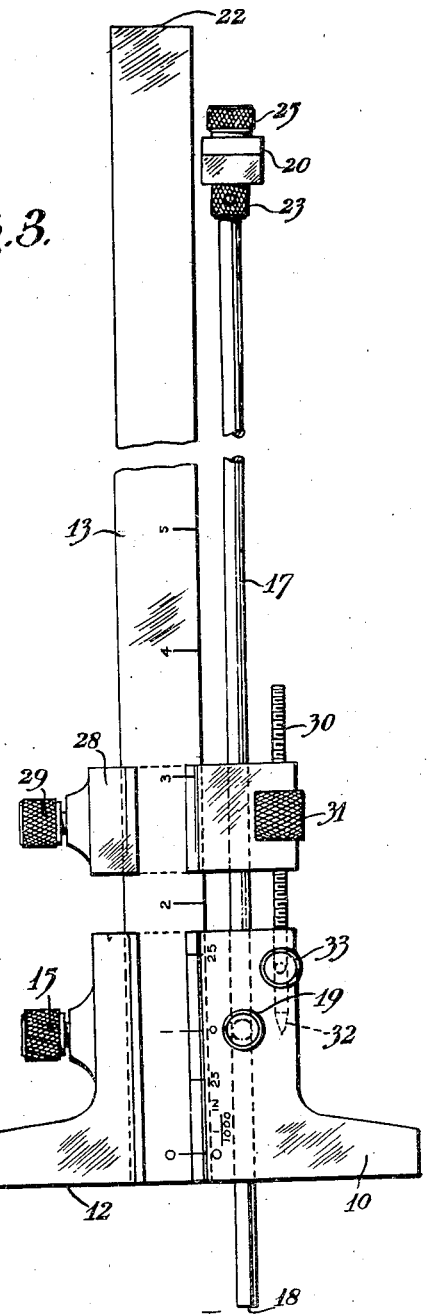
Inventor
CHARLES N. M. WORNELL.
By: Francis E. Boyer
ATTORNEY.

April 5, 1949.                C. N. McL. WORNELL                2,466,140
                                 DEPTH GAUGE
Filed June 19, 1945                                            2 Sheets-Sheet 2
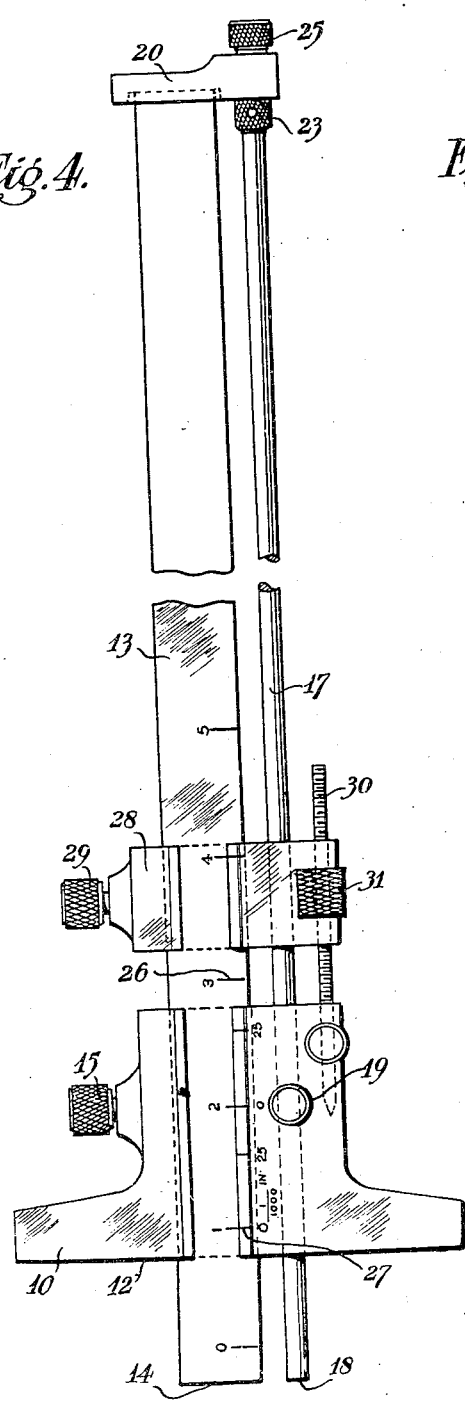
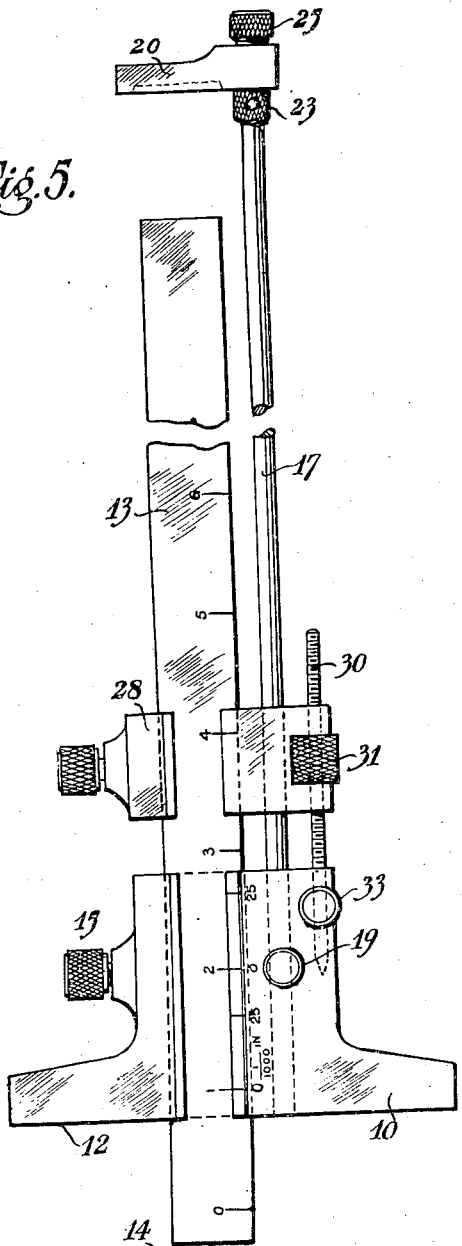
INVENTOR
CHARLES N. M. WORNELL.
By: Francis E. Boyce
ATTORNEY.

Patented Apr. 5, 1949

2,466,140

UNITED STATES PATENT OFFICE 2,466,140

DEPTH GAUGE

Charles Norman McLeod Wornell,
Chessington, England

Application June 19, 1945, Serial No. 600,302
In Great Britain June 30, 1944

3 Claims. (Cl. 33—169)

This invention relates to gauges of the kind having a calibrated rule with which is associated a sliding member.

In such gauges when constructed for taking long measurements the calibrated scale has to be of substantial thickness to provide the necessary rigidity. This reduces the utility of the gauge for other purposes, particularly for measuring the depth of small diameter holes.

The object of the present invention is to provide an improved gauge which will have a sufficient degree of rigidity combined with a rule of relatively small cross sectional dimensions.

According to the present invention an auxiliary member is provided on said sliding member said auxiliary member being disposed parallel to said rule and being of small cross-sectional dimensions relative to said rule. A head or stop may be mounted on said auxiliary member and be adapted to be operatively associated with said calibrated rule for the purpose of making the measurement by the use of said auxiliary member in association with said calibrated rule. The stop may be movable into and out of the path of the calibrated rule and may be removably secured to one end of the auxiliary member. The auxiliary member may pass through the sliding member to which it may be clamped in any desired position. Alternatively, the head or stop may be mounted on the calibrated rule and be adapted to be operatively associated with the auxiliary member.

One form of the invention, applied to a depth gauge, is illustrated in the accompanying drawings, wherein:

Fig. 1 is an elevation;
Fig. 2 is an underneath plan view; and
Figs. 3, 4 and 5 are elevations showing the gauge in various operative positions.

In the form shown the gauge comprises a sliding member 10 provided with a slot 11 normal to the flat end face 12. A calibrated rule 13 is provided, and the slot 11 in the sliding member 10 is adapted to accurately receive said rule so that the rule may slide therein. The end face 14 of the rule is parallel to the end face 12 of the sliding member. A thumbscrew 15 in the sliding member 10 is adapted to lock the rule to said sliding member in any relative position. The sliding member is also provided with a second slot or hole 16 adapted to accurately receive an auxiliary member 17, consisting of a rod of substantially smaller cross-sectional dimensions than the rule 13, so that said auxiliary member may slide in said sliding member. The slots 11 and 16 are parallel to each other, whereby the calibrated rule 13 and the auxiliary member 17 are also retained parallel to each other. The end face 18 of the auxiliary member is also parallel to the end face 12 of the sliding member and to the end face 14 of the rule 13. A thumbscrew 19 in the sliding member 10 is adapted to lock the auxiliary member 17 to the sliding member in any relative position.

The auxiliary member or rod 17 is provided at its end remote from the end face 18 with a head 20 recessed at 21 to accurately receive and engage the end face 22 of the calibrated rule 13. The relative lengths of the rule 13 and rod 17 and the position of the head 20 with its recess 21 are such that when the end face 22 of the rule 13 abuts the bottom of the recess 21 the end faces 14 and 18, respectively, of the rule 13 and rod 17 are in one plane parallel to the end face 12 of the sliding member 10. The end of the rod 17 is provided with a collar 23, secured thereto by a dowel pin 24; the head 20 is drilled to fit accurately on the rod 17 and be rotatable thereon, and a knurled screw-threaded nut 25, engaging a screw thread on the rod 17, is adapted to clamp the said head against the said collar.

When the gauge is to be used to gauge the depth of a hole or recess having a cross section smaller than that of the rule 13, the thumbscrew 19 is released from engagement with the rod 17, the said rod is slidden in the sliding member 10 so as to move the head 20 out of engagement with the rule 13, and the said head is then rotated on the rod 17 out of the plane of the rule 13 as shown in Fig. 3. The sliding head 10 and the rod 17 are then used in the usual manner to gauge the depth of the hole, the end face 18 of the rod being projected beyond the end face 12 of the sliding member in the manner shown in Fig. 3. The rod 17 is then locked to the sliding member 10 by the thumbscrew 19, in the position obtained. The rule 13 is then moved a suitable distance through the sliding member 10, the head 20 is returned into the plane of said rule and the rule is withdrawn through the sliding member until the end face 22 of the rule enters the recess 21 of the head 20 and abuts the bottom of said recess, the relative positions shown in Fig. 4 being obtained. The rule may then be locked, by means of the thumbscrew 15, to the sliding member 10, and the depth of the hole being gauged may be read off the calibrations 26 on the rule 13 against a scale 27 on the sliding member 10. The slot 11 in the sliding member 10 is open on the front face of the said member to enable the calibrations to be read, the edges of the open side of the slot being suitably shaped.

In an alternative method of using the gauge, the rule 13 is projected from the sliding member 10 to a position illustrated in Fig. 5 with a desired depth indicated by the calibrations 26 against the scale 27, the rule is locked to the member 10 by the thumbscrew 15, the rod 17 is moved through the sliding member 10 until the end 22 of the rule 13 is engaged in the recess 21 of the head 20 as illustrated in Fig. 4, the rod 17 is locked in position by the thumbscrew 19, the thumbscrew 15 is released, the head 20 is rotated out of the plane of the rule, the rule is withdrawn to the position illustrated in Fig. 3, and the rod 17 is then in position for gauging a recess or hole.

An auxiliary slide 28 is mounted on the calibrated rule 13 and rod 17, and is adapted to be locked to the rule by a thumbscrew 29. A fine screw-threaded rod 30 passes through the slide 28 and through a knurled nut 31 disposed in a slot in the side of the slide 28. The rod 30 is parallel to the rule 13 and rod 17, and the nut 31 is free to rotate in the slide 28, but is restrained against axial movement; rotation of the nut 31 causes the rod 30 to move axialy in the slide 28. The end of the rod 30 is adapted to be inserted in a hole 32 in the sliding head 10 and be locked therein by a thumbscrew 33. By locking the slide 28 to the rule 13, locking the rod 30 in the sliding member 10, and operating the nut 31, fine adjustment of the sliding member 10 relative to the rule 13 may be effected, a vernier scale 27 on the sliding member 10 being utilised.

The rod 17 described constituting the auxiliary member may be varied in form to suit circumstances, but it will be obvious that whatever form it takes additional rigidity is given to the gauge when the various parts are locked together, and when the end 22 of the rule is located in the recess 21 further additional support is afforded.

To secure the maximum advantage from the combination of the auxiliary member or rod with the rule the auxiliary member may have a cross section possessing maximum rigidity or stiffness at right angles to the direction of maximum rigidity or stiffness of the rule.

What I claim and desire to secure by Letters Patent is:

1. A gauge comprising a calibrated rule, a head in which said rule is slidably mounted, the said head having a face disposed in a plane normal to the path of sliding movement of said rule, an auxiliary member also slidably mounted in said head, said auxiliary member being disposed parallel to said rule and being of small cross-sectional dimensions relative to said rule, the paths of sliding movement of the said rule and of said auxiliary member in said head being parallel to each other, and a stop member pivotally mounted on said auxiliary member and normally disposed in the path of sliding movement of said rule thereby to abut the same and limit movement of the rule in one direction relative to said auxiliary member, said stop member being rotatable on said auxiliary member thereby to move the stop member out of said path, the relative lengths of said rule and auxiliary member being such that when said rule abuts said stop member the ends of the rule and of the auxiliary member project an equal distance from said face of said head.

2. A gauge according to claim 1 wherein means are provided to clamp said rule and said auxiliary member to said head in any desired relative positions.

3. A gauge according to claim 1 wherein said stop member is provided with a recess to receive the end of said rule and so locate said rule in abutting relation with said stop member.

CHARLES NORMAN McLEOD WORNELL.

REFERENCES CITED

The following references are of record in the file of this patent:

UNITED STATES PATENTS

| Number | Name | Date |
|---|---|---|
| 988,672 | Stiriss | Apr. 4, 1911 |
| 1,183,655 | Lamberson | May 16, 1916 |
| 2,256,030 | Lipani | Sept. 16, 1941 |

FOREIGN PATENTS

| Number | Country | Date |
|---|---|---|
| 4,631 | Great Britain | 1910 |